J. A. ALBIN.
PLOW OR APPARATUS FOR BREAKING SOIL BETWEEN THE STEMS OF VINES AND OTHER SIMILAR PLANTS.
APPLICATION FILED FEB. 10, 1919.
1,316,667.
Patented Sept. 23, 1919.
2 SHEETS—SHEET 2.
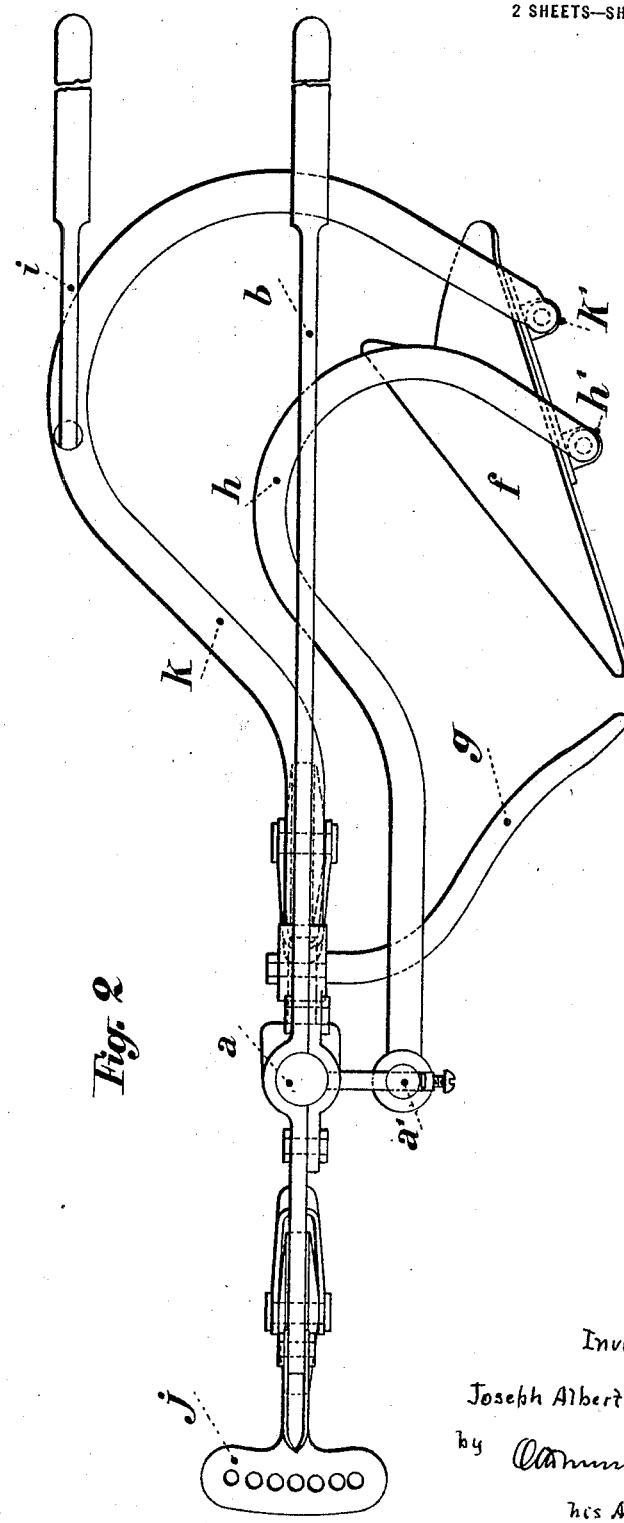
Inventor
Joseph Albert Albin
by
his Attorney

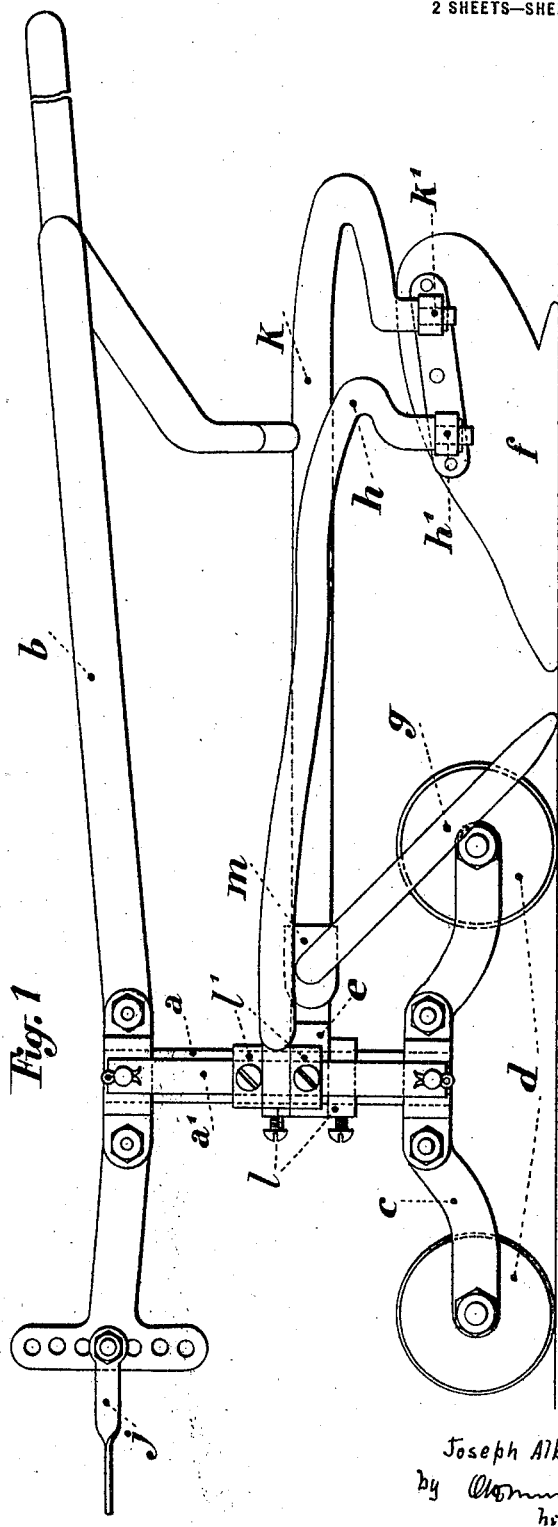

UNITED STATES PATENT OFFICE.

JOSEPH ALBERT ALBIN, OF PARIS, FRANCE.

PLOW OR APPARATUS FOR BREAKING SOIL BETWEEN THE STEMS OF VINES AND OTHER SIMILAR PLANTS.

1,316,667. Specification of Letters Patent. Patented Sept. 23, 1919.

Application filed February 10, 1919. Serial No. 276,046.

*To all whom it may concern:*

Be it known that I, JOSEPH ALBERT ALBIN, citizen of the Republic of France, residing at 75 Avenue Niel, Paris, in the Republic of France, have invented new and useful Improvements in Plows or Apparatus for Breaking Soil Between the Stems of Vines and other Similar Plants, of which the following is a specification.

This invention relates to a plow or apparatus for breaking the earth between the stems or feet of vines situated in the same row and as near as possible to such stems by means of a jointed guard which moves away when striking the vine stems or stalks and thereby actuates the share or colter carried by two arms articulated thereto and to a truck with two wheels.

In the accompanying drawings, shown by way of example, Figure 1 is a side elevation of the apparatus and Fig. 2 is a plan of the same.

This apparatus consists of a shaft $a$ forming an axis upon which are rigidly fixed a support $c$ provided with two wheels $d$ and a long handle $b$ having a jointed extension or yoke $j$. The shaft $a$ carries another shaft $a^1$ fixed parallel thereto. Upon $a$ is fixed the member $e$ capable of turning about itself and held in a vertical position by the two fixed rings $l$. This member $e$ carries, by the aid of the frame $m$, the beam $k$ and the guard $g$ serving as a pivot for this frame $m$. Upon the shaft $a^1$ is articulated the arm $h$ held at the proper height by the two fixed rings $l^1$. The two arms $k$ and $h$ carry at $k^1$ and $h^1$ the share $f$ articulated thereon. The handle $i$ allows the tiller to guide the apparatus properly.

The operation is as follows:

As the apparatus (drawn by animals or by a tractor) moves along a line or row of vine stems, as soon as the foot of such a stem comes in front of the guard $g$, the latter, by reason of the resistance met with acts upon the beam and arm $k$ and $h$ and causes the share $f$ to move aside thus avoiding the vine foot so as not to tear it out, but comes and breaks the earth in close proximity thereto. The share having now moved on, on account of the steering effected by the two wheeled truck, the rear part of the share $f$ takes again its initial direction, that is to say the share returns to its initial position relatively to the truck. Thus the share has properly plowed in a semi-circular path about the vine foot and close by the latter.

An identical operation follows with the next foot.

A similar passage on the other side completes the plowing around each foot.

It may be remarked that the articulation of the guard $g$ in the frame $m$ allows the latter to follow all the sinuosities of the soil. Moreover this arrangement enables it to operate on vine feet of various heights without breaking them or tearing them off.

The handle $i$ allows the plowman to avoid either too young or too old a vine which cannot be operated automatically.

Having now described my invention, what I claim as new and desire to secure by Letters Patent is:

1. A plow comprising a wheeled front truck, a rearwardly extending handle connected thereto, a plow beam pivoted in a vertical axis on said truck, a laterally extending arm carried by said truck having a vertical shaft thereon, a second plow beam pivoted on said shaft, a plow bottom at the rear end of the beams and pivoted to each beam, a guard carried by a beam and extending laterally beyond the land side of the plow bottom and a second handle connected to one of the plow beams.

2. A plow comprising a wheeled front truck, a rearwardly extending handle connected thereto, a plow beam pivoted on a vertical axis on said truck a laterally extending arm carried by said truck having a vertical shaft thereon at its outer end, a second plow beam parallel with the first beam and pivoted on said shaft, a plow bottom at the rear end of the beams and pivoted to each beam on spaced vertical axes, a guard carried by a beam and extending laterally beyond the land side of the plow bottom and a second handle connected to one of the plow beams.

In testimony whereof I have signed my name to this specification.

JOSEPH ALBERT ALBIN.

Copies of this patent may be obtained for five cents each, by addressing the "Commissioner of Patents, Washington, D. C."